A. R. PRIBIL.
CONNECTING ROD.
APPLICATION FILED OCT. 31, 1917.

1,282,286.

Patented Oct. 22, 1918.
2 SHEETS—SHEET 1.

Witness
Charles Balg
Karl H. Butler

Inventor
Alexis R. Pribil.

By
Attorneys

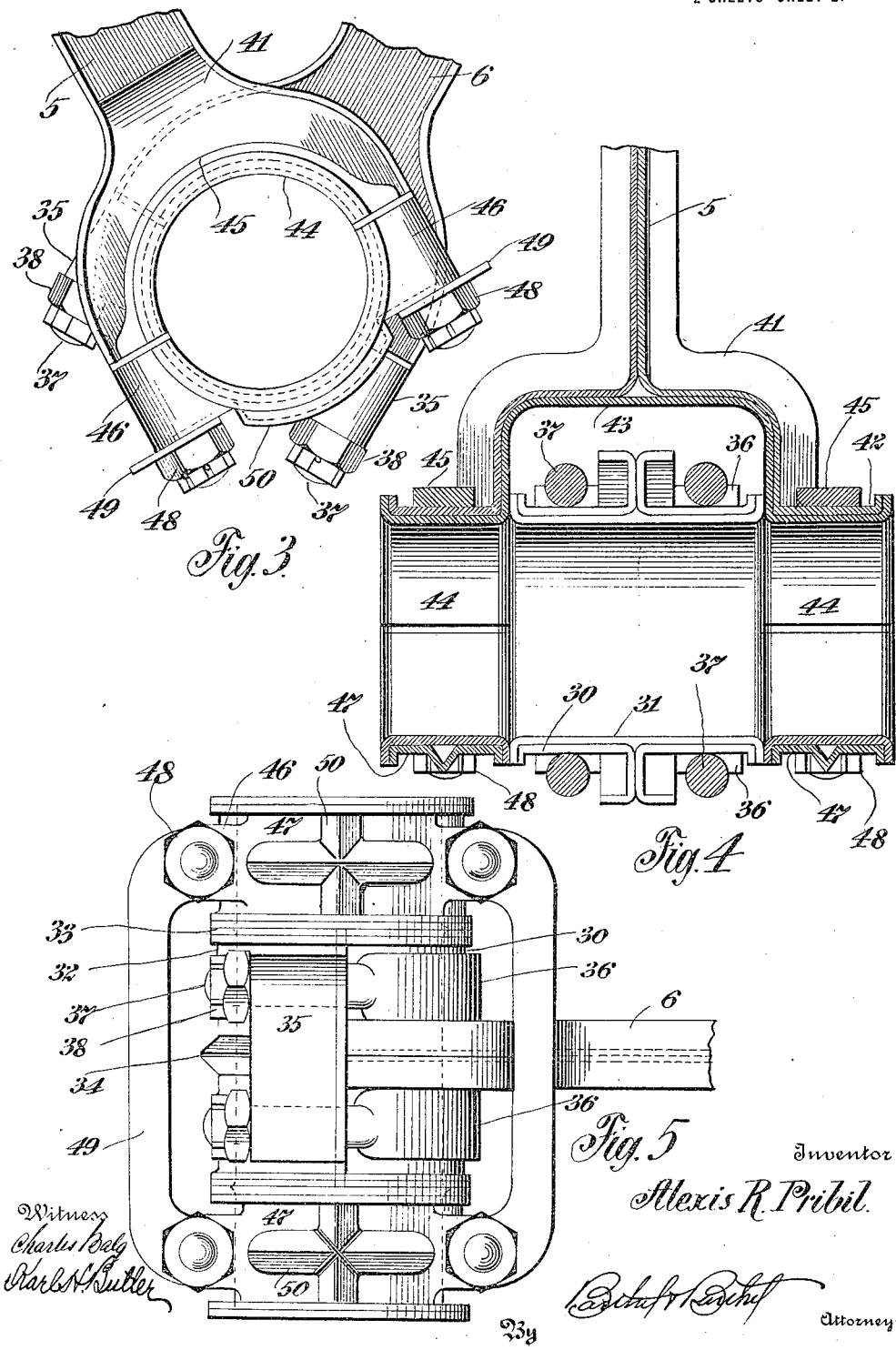

UNITED STATES PATENT OFFICE.

ALEXIS R. PRIBIL, OF CLEVELAND, OHIO.

CONNECTING-ROD.

1,282,286.         Specification of Letters Patent.         Patented Oct. 22, 1918.

Original application filed July 12, 1917, Serial No. 180,053. Divided and this application filed October 31, 1917. Serial No. 199,427.

*To all whom it may concern:*

Be it known that I, ALEXIS R. PRIBIL, a citizen of the United States of America, residing at Cleveland, in the county of Cuyahoga and State of Ohio, have invented certain new and useful Improvements in Connecting-Rods, of which the following is a specification, reference being had therein to the accompanying drawings.

This application is a division from my application filed July 12, 1917, Serial No. 180,053, disclosing novel connecting rods of which U bolts or stirrup members are important elements. The U bolts or stirrup members form part of a crank shaft bearing and are adapted for connecting the parts of the bearing so as to brace and stiffen the same, particularly those parts subjected to stresses and strains which have a tendency to fracture the rod between the crank shaft bearing and the shank of the rod.

The present invention relates to connecting rods that can be advantageously used in connection with a V type of motor or engine; the crank shaft bearings of said rods being constructed so that they may be compactly disposed on a crank shaft and held in sets whereby one rod cannot become longitudinally displaced, on the crank shaft of the engine or motor, relatively to the other rod.

The present invention also includes features referred to in the application above identified, also in another pending application filed December 26, 1916, Serial No. 138,955, and the subject matter of the present application will be hereinafter more fully considered and then claimed.

Reference will now be had to the drawings, wherein—

Fig. 3 is an enlarged side elevation of the crank shaft bearings of the rods;

Fig. 4 is a cross sectional view of the same;

Fig. 5 is a bottom plan of the connecting rods, this view as well as that shown in Fig. 4, having the rods disposed at right angles to each other, simply for the sake of clearness in illustrating;

Figure 1:
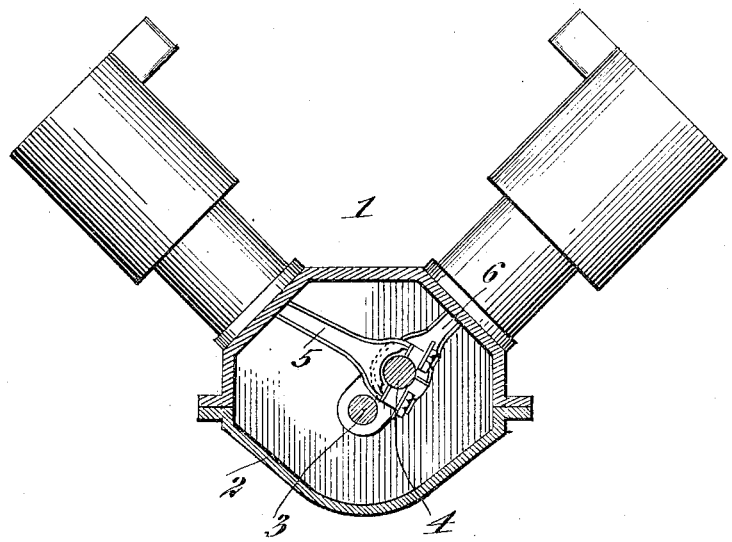
Figure 1 is an end view of a conventional form of V type motor or engine, the same being generally illustrated to show connecting rods in accordance with my invention.

In the drawing, 1 generally denotes a portion of a V-type motor or engine having a crank case 2, and a shaft 3 provided with crank portions 4. Connected to each crank portion of the shaft 3 are connecting rods 5 and 6, said rods extending into the cylinders of the engine and being connected to the pistons therein so that reciprocation of said pistons will impart movement to said connecting rods and a rotary movement to the shaft 3. The connecting rods necessarily assume different angles relatively to each other during the operation of the engine, and in order to connect said rods to a single crank portion of the shaft, said rods are provided with special crank shaft bearings, which have been illustrated in detail in Figs. 3, 4 and 5.

Before describing the crank shaft bearings of said rods, it might be well to mention each rod is made of pressed steel or other material that may be easily shaped and formed to add rigidity to a complete rod. Each rod is formed of tapering channel members disposed back to back and suitably connected together so as to form a shank, the small end of which terminates in a connection for a piston pin and the large end of which provides a bearing for the rod on the crank portion 4 of the shaft 3.

First considering the rod 6, said rod has the shank members thereof formed with semi-cylindrical sleeves 30 connected by a semi-cylindrical bushing 31. A cap is composed of semi-cylindrical sleeves 32 and a bushing 33, with the semi-cylindrical sleeve 32 provided with strengthening ribs 34 and two sets of apertured bosses 35. To connect the cap to the semi-cylindrical sleeve two U bolts 36 are employed and these U-bolts have band or strap portions that engage the semi-cylindrical sleeves 30 with the threaded stems or bolt portions 37 extending through the bosses 35 and provided with nuts 38. The U-bolts are at each side of the longitudinal axis of the connecting rods and constitute very durable means positively holding the cap in engagement with the fixed position of the crank shaft bearing. The form of rod just described may be constructed without resorting to spot welding, riveting or any other fastening means than the mechanical parts assembled as shown, although it may be convenient to spot weld here and there simply to maintain certain parts in position during the assembling of the connecting rod.

Now considering the rod 5, said rod has the shank members thereof offset, as at 41 and provided with semi-cylindrical sleeves 42. In the offset portions 41 of the shank members is placed a channel member 43 having semi-cylindrical bushings 44 within the semi-cylindrical sleeves 42.

On the semi-cylindrical sleeves 42 are placed straps or band U bolts 45 and the threaded portions or stems of these U-bolts extend through apertured bosses 46 carried by caps 47 that are held in engagement with the fixed portions of the bearings by nuts 48. The caps 47 are each pressed from steel and have reinforcing ribs 50.

It is therefore apparent that the single connecting rod has spaced crank shaft bearings and to prevent possible spreading action of these bearings, tie rod members 49 are employed at the sides of said bearings, the tie rod members having the ends thereof mounted on the U-bolts between the apertured bosses 46 and the nuts 48, shown in Fig. 3. These tie rod members provide clearance for the rod 6 and maintain the bearings in proper relation to the crank shaft bearing of said rod, although the crank portion of the shaft will, to a certain extent, serve this purpose.

By providing a twin connecting rod 5 with a portion that straddles or bridges the connecting rod 6, and its bearing it is possible to provide crank shaft bearings for the rod 5 that will have as great a bearing surface upon the crank shaft as the bearing of the rod 6, and yet maintain the rods 5 and 6 in a vertical plane so as to serve angularly disposed cylinders. This arrangement permits of a plurality of connecting rods being compactly assembled upon the crank shaft, or even any member to be driven by the reciprocable motion of pistons, consequently it is possible to materially reduce the longitudinal dimension of an engine of the V type.

Furthermore, the twin rod permits of independent bushings being used for each of the bearings in contradistinction to a single bushing which serve a plurality of bearings.

Figures 2, 6, 7:
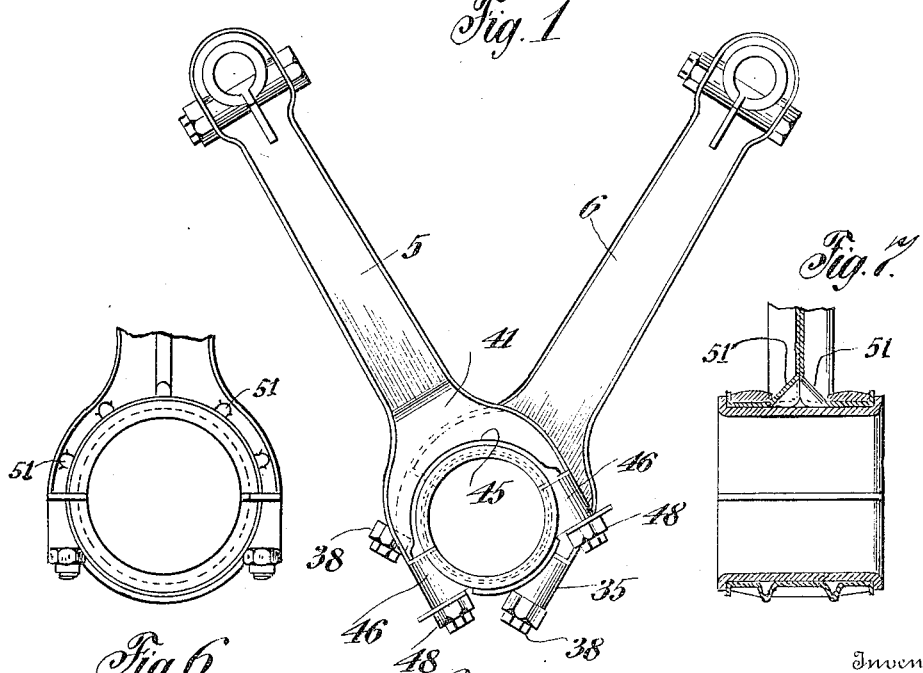
Fig. 2 is a side elevation of connecting rods.
Fig. 6 is a side elevation of a portion of a modified rod.
Fig. 7 is a longitudinal section of the same.

In Figs. 6 and 7 of the drawings, there is illustrated a portion of a connecting rod having ribs 51 that reinforce and stiffen the semi-cylindrical sleeve at their juncture with the shank members, and it will also be noted that the cap is provided with stiffening ribs.

What I claim is:—

1. A pressed steel connecting rod adapted to straddle another rod, comprising a shank having offset portions provided with bearings, a channel member in the offset portions of said shank having bushings in said bearings, caps for said bearings, and means embracing said bearings adapted to connect said caps thereto.

2. The combination of a connecting rod having a semi-cylindrical bearing, a cap therefor, another connecting rod having a portion straddling the semi-cylindrical bearing of the first mentioned rod, semi-cylindrical bearings carried by the straddling portion of said rod, caps for all of said bearings, and U-bolts snugly embracing all of said semi-cylindrical bearings and connecting said caps thereto.

3. A pressed steel connecting rod having spaced semi-cylindrical crank shaft bearings, caps therefor, and U-bolts snugly embracing said bearings and extending through said caps for connecting said caps thereto.

4. A connecting rod having spaced bearings, caps therefor, and tie members connecting said caps.

5. A connecting rod having spaced bearings, caps therefor, U-bolts connecting said caps to said bearings, and tie members connecting the U-bolts of one bearing to the U-bolts of the other bearing.

6. The combination with a connecting rod having a crank shaft bearing, of another connecting rod disposed at an angle thereto and having offset portions straddling the bearing of the first mentioned rod, crank shaft bearings carried by the straddling portion of the last mentioned rod, and tie members connecting said bearings independent of the first mentioned rod or the bearing thereof.

In testimony whereof I affix my signature in the presence of two witnesses.

ALEXIS R. PRIBIL.

Witnesses:
  M. J. WEEKER,
  E. D. NYKAMP.